United States Patent [19]
Glasser et al.

[11] Patent Number: 5,102,991
[45] Date of Patent: Apr. 7, 1992

[54] ALKYLENE OXIDE ESTERS OF LIGNIN SULFONIC ACID

[75] Inventors: Wolfgang Glasser, Blacksburg, Va.; Kaliprasanna Dhara, West Bengal, India

[73] Assignee: Virginia Tech Intellectual Properties, Inc., Blacksburg, Va.

[21] Appl. No.: 507,560

[22] Filed: Apr. 11, 1990

[51] Int. Cl.$^5$ ............................................. C08H 5/02
[52] U.S. Cl. .................................. 530/500; 530/502; 530/507
[58] Field of Search .................. 530/500, 502, 507

[56] References Cited

U.S. PATENT DOCUMENTS 2,854,444  9/1958  Monson et al. ...................... 530/500

Primary Examiner—John Kight, III
Assistant Examiner—Duc Truong
Attorney, Agent, or Firm—Mason, Fenwick & Lawrence

[57] ABSTRACT

Lignin sulfonates are converted into sulfonic acid esters by blocking free phenolic hydroxyl groups on the lignin sulfonates from reaction with a suitable protective group, subjecting the blocked lignin sulfonate in aqueous solution to ion exchange to produce the free sulfonic acid thereof, exchanging the aqueous solvent into a polar organic solvent, such as isopropanol, and reacting the sulfonic acid derivative in the polar organic solvent with a saturated or unsaturated aliphatic epoxide, preferably an alkylene oxide. The resulting sulfonic acid ester adduct may be isolated and purified from the reactants using solvent extraction. Lignin sulfonic acid ester adducts are produced that are soluble in a variety of organic solvents and insoluble in water.

8 Claims, No Drawings

ALKYLENE OXIDE ESTERS OF LIGNIN SULFONIC ACID

FIELD OF THE INVENTION

The present invention relates to esterification of lignin sulfonates, and relates more particularly to alkylene oxide ester adducts of lignin sulfonic acid.

1. Background of the Invention

Lignins are complex polymers of condensed substituted phenols that bind cellulose fibers together in wood and other cellulosic plants. Most wood contains between about 20% and 30% lignin. During the manufacture of paper, large quantities of lignin sulfonates are produced as by-products of the sulfite pulping process. The sulfite pulping process involves digestion of wood in an aqueous solution containing calcium bisulfite and an excess of sulfur dioxide; this causes sulfonation and solubilization of water insoluble lignin and hydrolytic splitting of the cellulose-lignin matrix.

About 65% of the solids content of the spent sulfite liquor is comprised of lignin sulfonic acid salts. In the past, pulp mills dumped the waste sulfite liquor into streams, but new pollution laws require that the spent sulfite liquor be processed to prevent discharge into open rivers and other natural bodies of water. This is normally accomplished by removing the solids, such as the lignin sulfonic acid salts, via evaporative concentration from aqueous solution (i.e., by spray drying or incineration) so that the inorganic chemicals can be reused. Although it is easier to recover and reuse the waste sulfite liquor if magnesium bisulfite is used instead of calcium bisulfite, the magnesium bisulfite process is more expensive than the calcium bisulfite process, and the large volume of lignin sulfonates generated by the pulping industry make it desirable to find further economic uses for this by-product.

Typical lignin sulfonates are the sulfonic ester salts of calcium, magnesium, sodium, or ammonium; in addition to their sulfonic acid functionality, lignin sulfonates often have aliphatic hydroxyl groups, phenolic hydroxyl groups, carboxyl groups, and carbonyl groups as prominent functionalities, and have the following general structure:

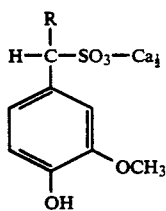

Presently, the highly polar, water soluble, polyaromatic, polyphenolic lignin sulfonates produced by the sulfite pulping process are widely used as stabilizers for asphalt emulsions, dispersing agents, and binders. Yet, the supply of lignin sulfonates exceeds the demand of such uses; this makes it highly desirable to convert lignin sulfonates to a water insoluble, organic solvent soluble state so they may have additional uses, such as in polymeric materials, plastics and resins.

The present invention forms water insoluble, organic solvent soluble lignin sulfonate derivatives by, first, converting lignin sulfonate via ion exchange into the free sulfonic acid derivative, and, second, esterifying the sulfonic acid derivative with an alkylene oxide in a non-aqueous solvent, preferably isopropanol, to obtain a lignin sulfonate ester product. This procedure is substantially facilitated by excluding from the latter reaction the phenolic hydroxyl groups through attachment of a suitable protective group to the phenolic hydroxyls present prior to converting the lignin sulfonate into the free sulfonic acid derivative.

2. Prior Art

One method for converting lignin sulfonates directly to methyl ether methyl ester derivatives is described in *Identification and Characterization of Paucidisperse Lignosulphonates, Holzforschung,* by Luthe et al, 40 (1986) Suppl., pp. 153-157, which is hereby incorporated by reference. Luthe et al render lignosulfonates soluble in methanol with a cation exchange resin, filter off the resin, and combine ethereal diazomethane to the filtrate. After removal of excess diazomethane and solvents, the methylated products are dissolved in methylene chloride, resulting in an approximately 70% yield of an organic solvent soluble product. Because diazomethane is highly toxic to humans, and gaseous diazomethane may explode upon heating to 100° C. or on contact with rough glass surfaces, it is desirable to use a simpler and safer method of conversion. Furthermore, the diazomethane method only produces alkyl ethers and esters, not hydroxyalkyl or other substituted alkyl ethers and esters of lignin sulfonic acid.

Previously, in *Lignin. XVII. Preparation and Characterization of Acetyl Lignin Sulfonate Methyl Esters, Macromolecules,* Glasser et al, Vol. 8, No. 8, No. 5 (Sept.-Oct. 1975), pp. 565-573, acetyl lignin sulfonic acid methyl esters were formed by reacting lignin sulfonate fractions from milled wood lignin in pyridine with acetic anhydride. After vacuum evaporation to yield the acetylated product, the calcium salts of the lignin sulfonate acetates were dissolved in water, and the free sulfonic acids were prepared by cationic exchange. The free sulfonic acid solutions were neutralized with silver oxide, filtered, freeze-dried, dissolved in acetonitrile, and then reacted with excess methyliodide for 24 hours at room temperature; after removal of silver iodide by filtration, the filtrate was vacuum evaporated to yield an amorphous acetylated lignin sulfonate methyl ester in about 80% weight yield.

Although this represents an adequate method for esterifying lignin sulfonates on an analytical scale, this procedure has neither been intended, nor considered, for industrial-scale operations. Involvement of silver, low yields, the light-sensitivity of silver salts, and the combination of ion exchange and freeze drying operations, all make large scale use of this method of esterification impractical.

The prior art methods of forming methyl esters of lignin sulfonates are too complicated and expensive to be attractive for commercial application on a large scale. Therefore, it is desirable to develop new methods for producing organic solvent soluble, water insoluble lignin sulfonic acid ester products that have appropriate hydroxy or other functionalities for subsequent use in polymeric materials, plastics, and resins. One highly desirable alternative is to react lignin sulfonic acid with alkylene oxides (also known as alkene oxides) or substituted alkylene oxides to produce a variety of lignin sulfonate derivatives. (Note that alkylene oxides have numerous synonyms; for example, propylene oxide is also referred to as propene oxide, butylene oxide is referred to as butene oxide, and ethylene oxide and the preceding are all known as oxiranes.)

In U.S. Pat. No. 3,770,706, Walles discloses heterogenous, gas-phase reaction of an alkylene oxide or similar epoxide with surface sulfonated organic polymers to form the corresponding ester of sulfonic acid. Walles first reacts a solid organic polymer, such as an epoxy resin, phenol formaldehyde resin, urea formaldehyde resin, silicone, polyethylene, polystyrene, polypropylene, or polyurethane, with gaseous sulfur trioxide to form sulfonic acid groups on the surface of the organic polymer. After gas-phase reaction of an epoxide with the sulfonic acid groups, the surface sulfonated-epoxidized articles are useful as substrates for painting and metal-coating, and have improved properties that make them suitable for use in containers for oleophilic materials. However, Walles is not concerned with lignin sulfonate, or with any condensation reaction in the liquid phase.

In *Lignins—Occurence, Formation, Structure And Reactions*, Wiley-Interscience, K. V. Sarkanen et al., New York (1971), pp. 519 and 520, it is disclosed that in basic solutions, phenolic hydroxyl groups that are not conjugated through the benzene ring with carbonyl or unsaturated moieties in the side-chain react quantitatively with ethylene oxide. The oxirane functionality reacts preferentially with the phenolic hydroxyls, rather than the aliphatic hydroxyls, due to the much greater nucleophilicity of the phenoxide anions and the more complete ionization of phenolic as compared to aliphatic hydroxyl groups under alkaline conditions. Thus unreacted aliphatic hydroxyls remain available to react in subsequent reactions.

The reactivity of phenolic hydroxyls with oxiranes is applied in several U.S. Patents, such as U.S. Pat. No. 4,454,066, issued to Dilling et. al., U.S. Pat. No. 4,184,845, issued to Lin, and U.S. Pat. No. 3,672,817, issued to Falkehag, all of which are herein incorporated by reference. These patents are directed to reducing lignin color by blocking the phenolic hydroxyl group so the lignin may be used as a dye dispersant. The lignins employed include sulfite lignins from acid and neutral processes, kraft lignins from sulfate pulping processes, and lignins derived from other alkaline processes:, such as soda or modified soda processes. Useful reactants for blocking the phenolic hydroxyl groups on the sulfonated lignins include alkylene oxides, such as ethylene oxide, halogen-containing alkyl alcohols, such as 2-chloroethanol, and alkylene carbonates, such as ethylene carbonate. However, there is no teaching of how to react lignin sulfonic acid salts or lignin sulfonic acids with an epoxide to produce water insoluble, organic solvent soluble lignin sulfonic acid esters.

Thus, there remains a need for a process to produce water insoluble, organic solvent soluble lignin sulfonate ester products in a safe and efficient manner. There is also a need for lignin sulfonic acid ester products which can be used as components in polymeric materials, plastics and resins. Further, there is a need for water insoluble, organic solvent soluble lignin sulfonic acid ester products which have free aliphatic hydroxyl or other functionalities suitable for use in condensation, derivatization, or other polymerization reactions to form polymeric materials, binders, plastics, etc.

Therefore, it is a primary object of this invention to provide a new process for producing lignin sulfonate products which are insoluble in water, soluble in organic solvents, and suitable for use as components in polymeric materials, plastic, and resins.

It is a further object of this invention to provide a process for producing lignin sulfonic acid ester products which avoids the use of toxic or explosive reactants.

It is a still further object of this invention to provide a process for producing lignin sulfonic acid esters which is simple to perform, efficient and inexpensive so that it can be used on a commercial scale.

It is another object of this invention to provide a process for producing lignin sulfonic acid ester products which can utilize lignin sulfonates produced by treatment of lignocellulosic plant materials with aqueous solutions of $SO_2$ and a suitable base, such as calcium hydroxide or sodium hydroxide, or, alternatively, lignin sulfonates produced by acid sulfite pulping processes.

It is yet another object of the present invention to provide new lignin sulfonic acid ester products having hydroxyalkyl sulfonate esters by condensation with an alkylene oxide.

SUMMARY OF THE INVENTION

These and other objects of the invention are achieved in a preferred embodiment by, first, blocking the reactivity of the phenolic hydroxyl groups in the lignin sulfonate by conversion to ethers or esters through the attachment of a suitable protective group, second, subjecting the blocked lignin sulfonate to cation exchange in aqueous solution to produce the free sulfonic acid functionality, and, third, after exchanging the aqueous solvent into a polar organic solvent, reacting the sulfonic acid derivative in the polar organic solvent with ethylene oxide, propylene oxide, butylene oxide, or another suitable alkylene oxide.

The alkylene oxide adduct is recovered by adding water and an at least substantially water-immiscible organic solvent, such as ethyl acetate; any unreacted lignin sulfonic acid, along with other organic solvent insoluble components, are retained in the aqueous phase, while the lignin sulfonate ester adduct is retained in the organic phase. The lignin sulfonate ester adduct may be recovered by evaporation and precipitation into a water immiscible, low boiling, non-polar solvent, such as diethyl ether, petrol ether, or can be recovered by any other technique known to one of skill in the art. The particular organic solvents which the water-insoluble ester adducts are soluble in will depend on chemical factors, such as the type of sulfonic acid ester formed, and the degree of esterification.

DETAILED DESCRIPTION OF THE PREFERRED EMBODIMENTS

In describing the preferred embodiments of the subject invention, specific terminology will be employed for the sake of clarity. However, the invention is not intended to be limited to the specific terms so selected, and it is to be understood that each specific term includes all technical equivalents which operate in a similar manner to accomplish a similar purpose.

The lignin sulfonate ester adducts of the present invention are derived from lignin sulfonates having the following general structure:

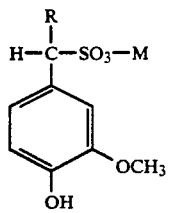

where R preferably is an alkyl, acetyl, hydroxyalkyl, fatty acid, polymer, lignin containing polymer, or other organic moiety, and M is an alkaline or alkaline earth metal, $NH_4^+$, or other substituent which forms a water soluble lignin sulfonate.

In a preferred embodiment, the phenolic hydroxyl group is first acetylated to render it non-reactive. Acetylation is carried out by slurrying the lignin sulfonate in a mixture of pyridine and acetic anhydride overnight. Evaporation of the solvent yields water soluble acetylated lignin sulfonate solids having the following structure:

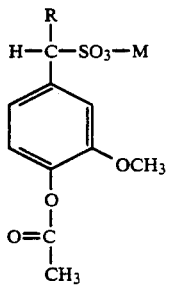

where R and M are the same as in the general lignin sulfonate structure provided above.

Preferably, after dissolving the acetylated sulfonate solids in water, the aqueous solution is ion-exchanged using Amberlite ® resin in its $H^+$. form, or other cationic exchange resin. The cation exchange resin exchanges the salt-forming cation to produce the protonated free sulfonic acid form.

In a preferred embodiment, after cation exchange, the aqueous solution of the acetylated lignin sulfonic acid is concentrated by evaporating off water under reduced pressure; isopropanol is added when most of the water has been removed, and most of the remaining water is then removed by azeotropic distillation of the isopropanol and water mixture until a concentrated solution consisting essentially of free lignin sulfonic acid in isopropanol is prepared. The solution is held at 0° C., and agitated while excess propylene oxide is added dropwise. After slowly heating the mixture to room temperature under continued stirring, the mixture is concentrated under reduced pressure, and the lignin sulfonic acid ester adduct is recovered by any suitable method, such as by using a mixture of water and ethyl acetate.

In a preferred embodiment, the lignin sulfonic acid ester products that stay in the ethyl acetate phase may be collected and purified by concentration and precipitation into petroleum ether, hexane, diethyl ether, or a similar organic solvent. Note that the organic solvents which the water-insoluble lignin sulfonic acid ester adducts are soluble in will depend on the nature of the sulfonate ester moiety and the blocking group on the phenolic hydroxyl While it is possible to obtain a solid lignin sulfonic acid ester adduct by evaporation of the ethyl acetate phase, a purer product is obtained by precipitation of the lignin sulfonic acid ester adduct into a sufficiently non-polar organic solvent The precipitated solids are then separated by filtration and drying to provide a water insoluble, polar organic solvent soluble solid lignin hydroxypropylsulfonate ester product in nearly quantitative yield; this has been determined by analysis of the UV-absorbing compounds that remain in the aqueous extract.

Early experiments on a model compound having the structure:

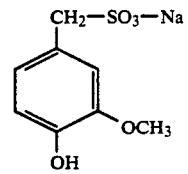

involved first subjected the model compound to ion exchange in aqueous solution with Amberlite ® IR-120 resin for 30 minutes at room temperature to provide the free sulfonic acid functionality. Upon reaction for 72 hours at room temperature under aqueous acidic conditions with propylene oxide, only low yields of the following sulfonic acid ester products resulted:

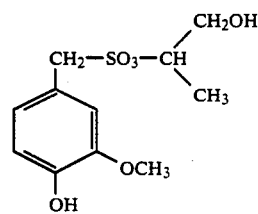

AND

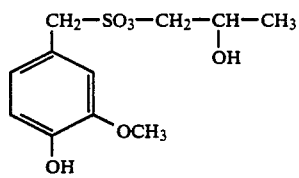

The phenolic hydroxyl groups were inhibited from reacted with the epoxide by the acidic conditions. When this reaction procedure was applied to a corresponding solution of lignin sulfonate salts, essentially none of the reaction products became soluble in organic solvents as judged by the distribution of color between the inorganic and organic phase of the extraction medium. This indicates that the lignin sulfonic acid functionality does not react to any substantial degree with an epoxide in aqueous solution.

It is apparent from this that, in order to get an organic solvent soluble, water-insoluble lignin sulfonate ester adduct from a lignin sulfonic acid, it is necessary to carry out the esterification reaction in an essentially non-aqueous medium. However, substantial difficulties have been encountered in trying to exchange lignin sulfonic acid from an aqueous solution into a non-aqueous solution; this is due to reactions involving the phenolic hydroxyl groups. For example, experiments that attempted to exchange lignin sulfonates from aqueous solutions to isopropanol caused a black precipitant to form, and did not produce measurable quantities of the lignin sulfonic acid ester adduct when reated with an epoxide.

The present invention solves this problem by preliminary or permanent blocking of the phenolic hydroxyl groups by etherification or esterification prior to exchanging lignin sulfonic acids into a polar organic solvent; this prevents secondary condensation reactions from taking place between the sulfonic acid groups and phenolic moieties during the water-removal step.

Thus, in a preferred embodiment, it is necessary to first block the phenolic hydroxyl group by esterification or etherification with a suitable protective group, and produce phenolic hydroxyl-free lignin sulfonate derivatives. Once the phenolic hydroxyl group has been blocked from reaction in this manner, the blocked lignin sulfonate derivatives are subjected to ion exchange to produce the lignin free sulfonic acid derivative.

In order to react the lignin sulfonic acid group with an epoxide, in nearly quantitative yield, it is then necessary to exchange the water solvent with a polar organic solvent which is capable of dissolving the lignin sulfonic acid, the epoxide, and the resulting lignin sulfonic acid ester product. A suitable solvent is isopropanol, but other polar organic solvents can be used. Solvents such as methanol and ethanol may also be used, but they are not preferred due to the difficulties involved in maintaining anhydrous reaction conditions or derivative solubility. The alkylene oxide added to the lignin sulfonic acid in the polar organic solution may be replaced with another reactant capable of forming an ester with the lignin sulfonic acid functionality, such as, but not limited to, episulfides and alkylene carbonates.

A preferred embodiment of the present process involves:
1. Protecting or blocking the phenolic hydroxyl groups of lignin sulfonate salts via esterification, etherification or hydroxyalkylation in aqueous solution to produce phenolic hydroxyl-free lignin sulfonate derivatives;
2. Converting the thus-blocked lignin sulfonate salt in aqueous solution to the free sulfonic acid;
3. Exchanging the aqueous solvent with a suitable polar organic solvent for reacting the sulfonic acid with a suitable alkylene oxide (or other sulfonic acid ester forming reactant), such as, but not limited to, ethylene oxide, propylene oxide or butylene oxide; and
4. Separating the water insoluble, organic solvent soluble lignin sulfonic acid ester product of the following general structure:

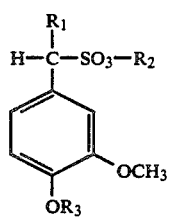

where $R_1$ is preferably an alkyl, acetyl, hydroxyalkyl, fatty acid, polymer, lignin, lignin containing polymer, or other moiety, $R_2$ is a hydroxyalkyl, hydroxyalkene, substituted hydroxy alkyl, alkenyl, alkynyl, thiosubstituted alkyl, or thiosubstituted alkenyl, and $R_3$ is a hydroxy alkyl, alkyl, acetyl, or other protective group which will not interfere with the reaction of the sulfonic acid functionality with an alkylene oxide, or other ester forming reactant, in a polar organic solvent, such as isopropanol.

The invention will be better understood from a detailed description of other specific embodiments, using non-limiting examples, which relate to the formation of lignin sulfonic acid ester adducts of alkylene oxides.

EXAMPLE I

Spent sulfite liquor solid products were acetylated at the hydroxyl groups by slurrying in a mixture of pyridine and acetic anhydride overnight. The solvent was evaporated to yield acetylated lignin sulfonate solids, which were then dissolved in water. The aqueous solution of the acetylated sulfonate solids was then ion-exchanged to the free sulfonic acid using Amberlite ® exchange resin in its H+ form. Note that any other suitable ion exchange resin or ion exchange method known to one of skill in the art may be used. The aqueous solution of the acetylated lignin with free-sulfonic acid functionality was concentrated by evaporating the water under reduced pressure, and isopropanol was added when most of the water had been removed. The remaining water was removed by azeotropic distillation of the isopropanol/water mixture yielding a concentrated solution of free lignin sulfonic acid in isopropanol.

The lignin sulfonic acid/isopropanol solution was cooled in an ice bath to approximately 0° C. Excess propylene oxide was added dropwise as the solution was agitated; the temperature of the mix was monitored to ensure constant reaction conditions. Once excess propylene oxide had been added, the mixture of propylene oxide, lignin sulfonic acid, and isopropanol was slowly warmed to room temperature under continued stirring. After several hours, the mixture was concentrated under reduced pressure, and equal parts of water and ethyl acetate were added. After shaking the mixture, the ethyl acetate soluble-fraction was collected, and the sulfonic acid ester recovered by concentration and precipitation in petroleum ether. Hexane, diethyl ether or similar substantially non-polar organic solvents can be used in place of petroleum ether. The precipitated solids were separated by filtration, and dried to yield a solid, water-insoluble, polar organic solvent soluble lignin hydroxypropylsulfonic acid ester product; the lignin sulfonate ester product was formed in approximately 90% yield, as determined by gravimetric means, and by the removal of water-soluble colored components during isolation.

EXAMPLE II

The procedure of Example I was followed, but ethylene oxide was reacted with the acetylated lignin sulfonic acid instead of propylene oxide with yields similar to Example I.

EXAMPLE III

The procedure given in Example I was followed, but butylene oxide was reacted with the acetylated lignin sulfonic acid rather than propylene oxide with yields similar to Example I.

EXAMPLE IV

Lignin sulfonate solids were combined with water and sodium hydroxide, and reacted with ethylene oxide while stirring at 120° C. for 8 hours to block the phenolic hydroxyl groups. The resulting reaction mixture was ion-exchanged using Amberlite ® resin in its H+-form, followed by concentration and solvent exchange according to the procedure given in Example I. The 2-hydroxyethoxy lignin sulfonic acid was then reacted with propylene oxide, and isolated in accordance with the procedure described in Example I.

EXAMPLE V

Lignin sulfonate solids were combined with water and sodium hydroxide, and then reacted with propylene oxide at 25° C. overnight with additional propylene oxide added the next morning and afternoon. The resulting reaction mixture was ion-exchanged using Amberlite ® resin in its H+-form, followed by concentration and solvent exchange according t the procedure given in Example I. The 2-hydroxypropoxy lignin sulfonic acid was then reacted with propylene oxide and isolated in accordance with the procedure described in Example I.

EXAMPLE VI

The procedure given in Example V was followed, but butylene oxide was reacted with the alkaline lignin sulfonate solution prior to ion-exchange and reaction with propylene oxide in an organic solvent. Examples IV, V, and VI all had high yields of hydroxyalkoxy lignin sulfonate ester product.

EXAMPLE VII

The same procedure as Example IV, except that a chloroform-acetone mixture was added to the lignosulfonate ester adduct formed to separate the product from the reactants; no change in yield was noted.

EXAMPLE VIII

The same procedure as Example I, except that the calcium salt of lignin sulfonic acid was the starting material. The lignin sulfonate ester adduct product of Example I was formed in approximately 90% yield.

EXAMPLE IX

The same procedure as Example VIII, except that allyl glycidyl ether was reacted with the blocked lignin sulfonic acid instead of propylene oxide to yield a product having the following general structure:

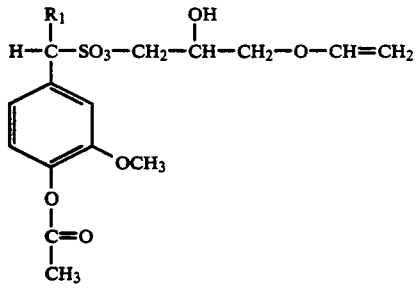

EXAMPLE X

The same procedure as Example IX, except that the blocked lignin sulfonic acid reagent was the hydroxypropyl ether derivative obtained by the procedure of Example V, yielding products with the following general structure:

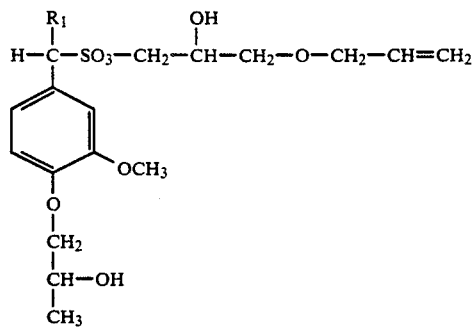

AND

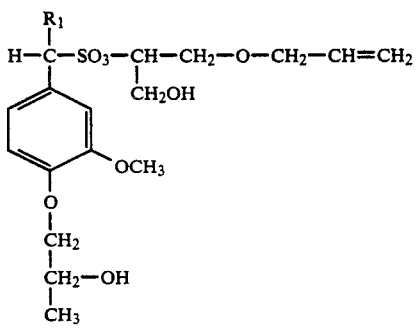

EXAMPLE XI

The same procedure as Example VIII, except that epichlorohydrin was reacted with the blocked lignin sulfonic acid instead of propylene oxide to yield a product with the following general structure:

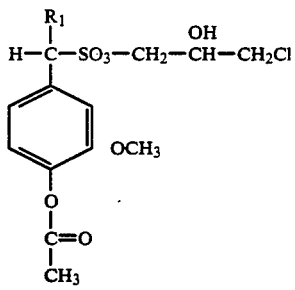

From the above teachings, it is apparent that many modifications and variations of the present invention are possible. It is therefore to be understood that, within the scope of the appended claims, the invention may be practiced otherwise than as specifically described.

What is claimed is:

1. Alkylene oxide ester adducts of lignin sulfonic acid.

2. Sulfonic acid esters, comprising:
 sulfonic acid ester adducts having the following structure:

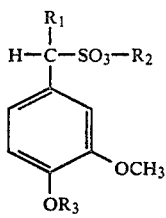

wherein $R_1$ is an organic moiety;

$R_2$ is selected from the group comprised of alkenyls, and substituted alkyls; and $R_3$ is a protective group;

whereby said ester products are water insoluble and soluble in organic solvents.

3. A composition according to claim 2, wherein said organic moiety is selected from the group comprising alkyls, acetyls, fatty acids, polymers, lignin, and lignin containing polymers;

said protective group is selected from the group comprising hydroxyalkyls, and acetyls; and $R_2$ is selected from the group comprised of hydroxyethyl, hydroxypropyl, hydroxybutyl, 3-chloro-2-hydroxypropyl, and 3-(propyl-2-enoxy)-2-hydroxypropyl.

4. A process for preparing lignin sulfonic acid ester products, comprising the steps of:

(a) reacting the phenolic hydroxyl functionalities of water soluble lignin sulfonates with a blocking group;

(b) converting the sulfonate functionalities on said blocked derivatives into free sulfonic acid functionalities; and (c) reacting said free sulfonic acid functionalities with ester forming reactants to form organic solvent-soluble, water-insoluble lignin sulfonic acid esters.

5. A process according to claim 4, wherein step (a) is carried out in an aqueous solvent and step (c) is carried out in an alcohol solvent.

6. A process according to claim 5, wherein step (a) comprises the step of reacting said phenolic hydroxyl functionalities with a blocking reactant selected from the group comprised of alkyl anhydrides, and epoxides and step (c) comprises the step of reacting said free sulfonic acid functionalities with an epoxide selected from the group comprised of ethylene oxide, propylene oxide, butylene oxide, allyl glycidyl ether, and epichlorohydrin.

7. A process according to claim 4, wherein step (a) comprises the step of:

reacting lignin sulfonate solids with an epoxide in a basic aqueous solution; and step (b) comprises the step of:

subjecting said blocked derivative formed in step (a) to ion-exchange to convert the same to a free sulfonic acid.

8. A process according to claim 7, wherein said epoxide in step (a) is selected from the group comprised of ethylene oxide, propylene oxide, butylene oxide, allyl glycidyl ether, and epichlorohydrin; and said epoxide in step (c) is selected from the group comprised of ethylene oxide, propylene oxide, butylene oxide, allyl glycidyl ether, and epichlorohydrin.

* * * * *